A. SCHMIDT.
SPARK PLUG.
APPLICATION FILED MAY 1, 1911.
1,015,843.
Patented Jan. 30, 1912.
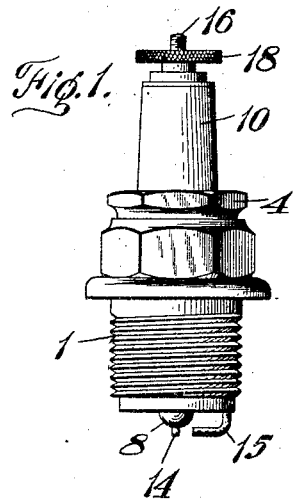
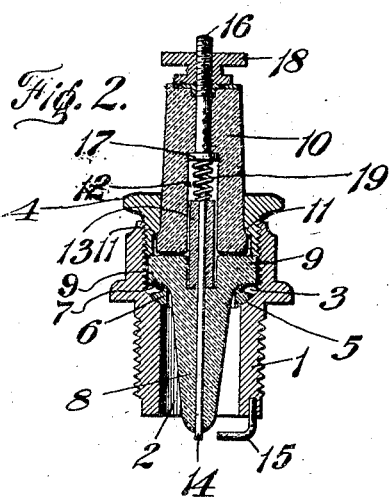
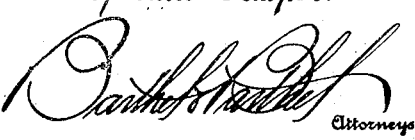

UNITED STATES PATENT OFFICE.

ALBERT SCHMIDT, OF FLINT, MICHIGAN, ASSIGNOR TO CHAMPION IGNITION CO., OF FLINT, MICHIGAN, A CORPORATION OF MICHIGAN.

SPARK-PLUG.

1,015,843.  Specification of Letters Patent.  Patented Jan. 30, 1912.

Application filed May 1, 1911. Serial No. 624,334.

*To all whom it may concern:*

Be it known that I, ALBERT SCHMIDT, a citizen of the United States of America, residing at Flint, in the county of Genesee and State of Michigan, have invented certain new and useful Improvements in Spark-Plugs, of which the following is a specification, reference being had therein to the accompanying drawings.

This invention relates to improvements in spark plugs and its object is to provide a simple and cheap construction designed to prevent the breaking of the parts by contraction and expansion and further to provide certain other new and useful features in the construction and arrangement of parts all as hereinafter more fully described reference being had to the accompanying drawing in which—

Figure 1 is a side elevation of a device embodying the invention; Fig. 2, a vertical section through the same; Fig. 3 is a transverse section of a seating collar detached; and Fig. 4 is a similar view of the collar after having been used in the plug.

As shown in the drawings 1 is a metal bushing formed with an externally screw-threaded end adapted to be screwed into an opening in an engine cylinder by means of a hexagonal head on its outer end. The bushing is formed with an axial bore 2 which is enlarged at the upper end or head of the bushing to form a chamber 3, the wall of which is formed with a screwthread to receive the screwthreaded end of a ring nut 4. The bottom or inner end of the chamber 3 forms an inclined seat 5 for a ring or collar 6 which is similarly tapered or inclined at its lower side to fit the seat. This collar is also formed with a flange 7 extending upwardly therefrom at its inner edge around the opening therethrough.

An insulating plug formed of porcelain or other suitable material is made in three parts and secured within the bushing, the lower or inner part 8 being tapered to extend downwardly through the collar 6 in the axis of the bore 2 of the bushing. Near its upper end said plug member is enlarged, forming an annular shoulder at the lower side of the projecting flange 9, having a curved contact face to engage the flange 7 of the collar and when the member is forced downward into the collar by the engagement of the ring 4 with the upper end of said flange, this shoulder will bend or form the flange outwardly as shown in Fig. 4, so that the flange on the collar will form a closely fitting seat for the shoulder and make a tight joint.

The upper or outer member 10 of the insulating plug is tapered slightly, extending loosely through the ring 4, and near its inner end, is formed with an annular shoulder 11 adapted to be engaged by a corresponding shoulder formed on the inner side of said ring. The parts are so proportioned that the said member 10 will be loosely held by the ring, ample space being provided in the ring to permit the free expansion of said member. The members 8 and 10 of the plug are each formed with an axial bore and this bore is enlarged at the inner end of the outer member 10 and at the outer end of the inner member 8, said enlargements together forming an axial chamber 12 in said members to receive a tubular member 13 also formed of insulating material. The insulating member 13 of the plug fits loosely within its chamber and connects the two members 8 and 10, holding the same in axial alinement so that when so connected they form a continuous insulating plug extending completely through the bushing. Said tubular member thus serves to loosely interlock said inner and outer members, breaking joints therewith and preventing short-circuiting.

A wire 14 extends through the axial bore of the inner members 8 and 13 of the plug and forms one of the electrodes of the device, the other electrode being formed by a platinum wire 15 which is secured within a hole in the inner end of the bushing and bent at right angles toward the projecting end of the wire 14.

In the axial bore of the outer member 10 of the insulating plug is a rod 16 which is screwthreaded at its outer end and provided with a head 17 at its inner end to engage the end of the chamber 12. A binding nut 18 on the outer end of the rod holds the same in place and also serves as a means for attaching an electrical conductor thereto. Electrical connection is made between the outer end of the wire 14 and the head 17 by means of a coiled spring 19, within the chamber 12 attached to the upper end of the wire and engaging the head. This spring serves also to hold the member 13 seated upon the bottom of its chamber 12 in the inner member of the plug and the outer member raised with its shoulder 11 in contact with the shoulder on the rings to prevent excessive vibration of these members.

By forming the insulating plug in three parts as shown, the inner or intermediate member 13 serves to interlock the outer parts, forming a connection between them to hold the same in alinement and prevent short circuiting, and the liability of breakage from expansion or contraction is reduced to a minimum, while, should one of the parts be accidentally broken, it will not be necessary to renew the entire plug. By forming the collar 6 with a single upwardly extending flange of soft metal which is easily formed over by the engagement of the plug therewith, a tight joint is formed and the flange may be of such a width as to give a wide seat for the plug which will firmly hold the same in place.

Having thus fully described my invention what I claim is:

1. In a spark plug, the combination with a bushing, of an insulating member in the bushing comprising an inner member, an outer member abutting the outer end of the inner member, and an intermediate member loosely engaging the inner member at one end and extending across the plane of the abutting ends into engagement with the outer member and holding said members in axial alinement.

2. In a spark plug, the combination with a bushing, of an insulating member in the bushing comprising an inner insulating member, an outer insulating member abutting the outer end of the inner member, said members being formed with an axial chamber in their abutting ends and an axial bore, and an insulating member within said chamber connecting said inner and outer members and an electrode extending through the bore of the inner member and said tubular member.

3. In a spark plug, the combination with a bushing, of an insulating member in the bushing comprising an inner insulating member having an axial bore and an annular shoulder to seat within the bushing, an outer insulating member having an annular shoulder and an axial bore, the bores of said members being enlarged at the adjacent ends of said members to form an axial chamber, a tubular insulating member within the said chamber connecting said members to hold the same in axial alinement, an electrode extending through the bores of said members and said tubular member and an annular member within the outer end of the bushing in engagement with the outer end of the inner insulating member to hold the same seated and loosely engaging the shoulder on the outer insulating member.

4. In a spark plug, the combination of a bushing having an internally screwthreaded chamber forming an annular seat, an inner insulating member having an annular shoulder to seat within the bushing and formed with an axial bore, an outer insulating member formed with an annular shoulder and having an axial bore, an externally screwthreaded ring nut to engage the chamber and the upper end of the inner insulating member at its inner end, said ring nut being formed with a shoulder to engage the shoulder on the outer insulating member, and means within the axial bore of the insulating members for yieldingly holding the outer insulating member in engagement with the shoulder on the ring nut.

5. In a spark plug, the combination with a bushing, of an insulating member within the bushing comprising an inner member having an axial bore which is enlarged at the upper end of said members, an outer member formed with an axial bore which is enlarged at the lower end of said member, the enlargements of the bores in the adjacent ends of said members forming an axial chamber, a tubular insulating member in said chamber engaging the bottom thereof in the inner member, a wire extending through the bore of said inner member and said tubular member, and a coiled spring within the chamber between its upper end and the upper end of said tubular member therein.

6. In a spark plug, the combination of a bushing having an internally screwthreaded chamber in its outer end, an inner insulating member adapted to seat within said chamber and formed with an axial bore and an axial chamber in its upper end, an outer insulating member formed with an annular shoulder and an axial bore, a ring nut screwed into the chamber with its inner end engaging the outer end of the inner member and formed with an annular shoulder to engage the shoulder on the outer member, a spring within the axial chamber adapted to hold the outer member in engagement with the shoulder on the ring nut, and an electrode extending through the axial bore of said members.

7. In a spark plug, the combination of a bushing having an internally screwthreaded chamber in its outer end, an inner insulating member adapted to seat within said chamber and formed with an axial bore and an axial chamber in its outer end, an outer insulating member formed with an annular shoulder and an axial bore and a chamber in its inner end, a ring nut screwed into the chamber with its inner end engaging the outer end of the inner member and formed with an annular shoulder to engage its shoulder on the outer member, a tubular insulating member in the chamber of said inner and outer members, a wire forming an electrode extending through the bore of the inner member and the tubular member, a rod in the bore of the outer member, and a coiled spring between the upper end of the tubular member and the end of the chamber in the outer member, and forming an electrical connection between said wire and rod.

In testimony whereof I affix my signature in presence of two witnesses.

ALBERT SCHMIDT.

Witnesses:
B. DE GUICHARD,
F. J. UTLEY.